United States Patent
Beye et al.

(10) Patent No.: US 10,108,996 B2
(45) Date of Patent: Oct. 23, 2018

(54) GENERATING COMMUNICABLE LINKAGES FOR A CLOUD-BASED COMPETITIVE PROPOSAL SYSTEM

(71) Applicant: BANK OF AMERICA CORPORATION, Charlotte, NC (US)

(72) Inventors: Ricki A. Beye, Lambertville, NJ (US); Karrin A. Russo, Robbinsville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 302 days.

(21) Appl. No.: 15/078,359

(22) Filed: Mar. 23, 2016

(65) Prior Publication Data

US 2017/0278161 A1    Sep. 28, 2017

(51) Int. Cl.
  *G06Q 30/06* (2012.01)
  *G06F 17/30* (2006.01)
  *G06Q 30/08* (2012.01)

(52) U.S. Cl.
  CPC ..... *G06Q 30/0611* (2013.01); *G06F 17/3053* (2013.01); *G06Q 30/0609* (2013.01); *G06Q 30/08* (2013.01)

(58) Field of Classification Search
  CPC .................................................. G06Q 30/06
  USPC ...................................................... 705/26.1
  See application file for complete search history.

(56) References Cited

U.S. PATENT DOCUMENTS

| | | | | |
|---|---|---|---|---|
| 7,464,053 | B1 * | 12/2008 | Pylant | G06Q 30/06 705/35 |
| 9,865,000 | B1 * | 1/2018 | Lopez | G06Q 30/0201 |
| 2004/0193460 | A1 * | 9/2004 | Ducholet | G06Q 10/04 705/307 |
| 2014/0086177 | A1 * | 3/2014 | Adjakple | H04W 12/08 370/329 |
| 2014/0310155 | A1 * | 10/2014 | Postrel | G06Q 50/01 705/38 |
| 2015/0058146 | A1 | 2/2015 | Gaddam et al. | |
| 2018/0040042 | A1 * | 2/2018 | Platzker | G06Q 30/0611 |

* cited by examiner

Primary Examiner — Mila Airapetian
(74) Attorney, Agent, or Firm — Michael A. Springs; Moore & Van Allen PLLC; Nicholas C. Russell

(57) ABSTRACT

Embodiments of the invention are directed to a system, method, or computer program product for generating communicable linkages that collectively provide a cloud-based competitive proposal system. The competitive proposal system generates a user-specific competitive proposal profile containing user preferences, historic trends, and associated resource managers based on information collected from a user and user associated accounts. The competitive proposal system is triggered by the user signaling the system of a proposed transaction. The system requests term change proposals from resource managers that collectively provide a total resource amount required by the merchant to consummate the transaction. The term change proposals are evaluated and ranked by the competitive proposal system before being transmitted as a ranked list to the user device allowing the user to select a preferred term change proposal and complete the transaction.

20 Claims, 6 Drawing Sheets

GENERATING COMMUNICABLE LINKAGES FOR A CLOUD-BASED COMPETITIVE PROPOSAL SYSTEM

BACKGROUND

With advancements in communication technology and resource storage, managers of resources are now able to offer a wide variety of terms to fit the needs of users. The terms and/or user needs may continually change over a period of time without adjustments to resource utilization.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for a cloud-based competitive proposal service allowing a user to receive competitive term proposals from one or more resource managers in real time.

In some embodiments, the invention provides a cloud-based system for generating communicable linkages between systems allowing for a competitive proposal process. This invention generates a user-specific competitive proposal profile based on information collected from a user and user-associated accounts. Based on receiving from a user device a total resource amount required by a merchant, the competitive proposal system is triggered to allow resource managers access to the user-specific profile and request term change proposals from the resource managers. The competitive proposal system generates a ranked list of the term change proposals and transmits the ranked list to the user device allowing for user selection of a preferred term change proposal.

Embodiments of the invention relate to systems, methods, and computer program products for generating communicable linkages for a cloud-based competitive proposal service management system, the invention comprising: identifying user resources and one or more resource managers associated with the identified user resources; generating a user-specific competitive proposal profile, wherein the user-specific competitive proposal profile comprises user resources, user preferences, historic resource trends, and resource manager terms for resource use; triggering a communicable linkage with the one or more resource managers based on receiving a determined total resource amount required by a merchant; opening the communicable linkage with the one or more resource managers for resource manager term change proposals for providing the total resource amount to the merchant; receiving term change proposals from the one or more resource managers through the communicable linkage; generating a ranked list of resources from the one or more resource managers for providing the total resource amount to the merchant, wherein the ranked list of resources further comprise an order of preferred term changes relative to the user preferences; transmitting the ranked list of resources from the one or more resource managers to the user device; and allowing user selection of one of the ranked list of resources for providing the total resource amount to the merchant.

In some embodiments, the invention further comprises generating a confidence score of the resources on the ranked list of resources, wherein the confidence score comprises a confidence of the user employing a specific resource for providing the total resource amount to the merchant and completing a transaction, wherein generating the confidence score is based on weighted factors, wherein the weighted factors may include in descending order of weighted value: user preferences, past transaction data, historic trends, and/or location data associated with the user; identifying a first resource on the ranked list of resources with a confidence score that meets or exceeds a predetermined confidence limit; and transmitting, based on identifying the first resource, the first resource on the ranked list of resources to the merchant for providing the total resource amount to the merchant and completing the transaction.

In some embodiments, the one or more resource managers comprise financial institutions that provide a debit card, credit card, and/or line of credit to the user for providing the total resource amount to the merchant and completing the transaction.

In some embodiments, generating the ranked list of resources from the one or more resource managers further comprises analyzing the user preferences, wherein the user preferences include a preferred form of reward, incentive, and/or discount such as cash back, more reward points, lower interest rates, and/or the like provided to the user by an associated resource relative to current terms set forth by the one or more resource managers upon selection of the associated resource to complete the transaction.

In some embodiments, triggering the communicable linkage with the one or more resource managers based on determining the total resource amount required by the merchant further comprises receiving from the user device the determined total resource amount required by the merchant; and in response to receiving from the user device the determined total resource amount required by the merchant, establishing a communication link between the user device and the cloud-based competitive proposal service management system.

In some embodiments, receiving the term change proposals from the one or more resource managers through the communicable linkage further comprises a confidential bidding process, wherein the one or more resource managers submit a single, private proposal of terms for the resource associated with the one or more resource managers for completing a transaction and providing the total resource amount to the merchant.

In some embodiments, receiving term change proposals from the one or more resource managers through the communicable linkage further comprises a public auction, wherein the one or more resource managers can place competing proposals of terms for completing the transaction in response to a public, currently pending proposal of terms for the resource associated with the one or more resource managers for completing a transaction and providing the total resource amount to the merchant.

In some embodiments, generating the user-specific competitive proposal profile comprises pushing a user profile comprising user preference selectable indicators to the user device; receiving selected user preferences from the user device based on the pushing of the user profile; identifying historic trends associated with user accounts; and allowing the user to modify the user specific competitive proposal profile on the user device In some embodiments, the cloud-based competitive proposal service management system further comprises generating a cloud-based competitive proposal service application associated with the competitive proposal service management, wherein the cloud-based competitive proposal service application allows for communicable linkage between the resource managers systems, the user device, and a merchant point-of-transaction device for integrative transaction completion.

In some embodiments, the one or more resource managers comprise one or more manufacturers of competing products similar to a product included in a transaction comprising the total resource amount required by the merchant; and wherein the ranked list of resources comprises a ranked list of product proposals from the one or more manufacturers of the competing products similar to the product included in the transaction.

In some embodiments, generating the ranked list of product proposals from the one or more manufacturers of the competing products similar to the product included in the transaction comprises: analyzing the user preferences, wherein the user preferences include a preferred form of reward, incentive, and/or discount such as a lower price, a rebate, a coupon, and/or similar offers provided to the user by a manufacturer of a competing product upon selection by the user to include the competing product in the transaction; generating a confidence score of the product proposals on the ranked list of product proposals, wherein the confidence score comprises a confidence of the user selecting a specific product to include in the transaction, wherein generating the confidence score is based on weighted factors, wherein the weighted factors may include in descending order of weighted value: user preferences, past transaction data, historic trends, and/or location data associated with the user; identifying a first product proposal on the ranked list of product proposals with a confidence score that meets or exceeds a predetermined confidence limit; and transmitting, based on identifying the first product proposal, the first product proposal on the ranked list to the user device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
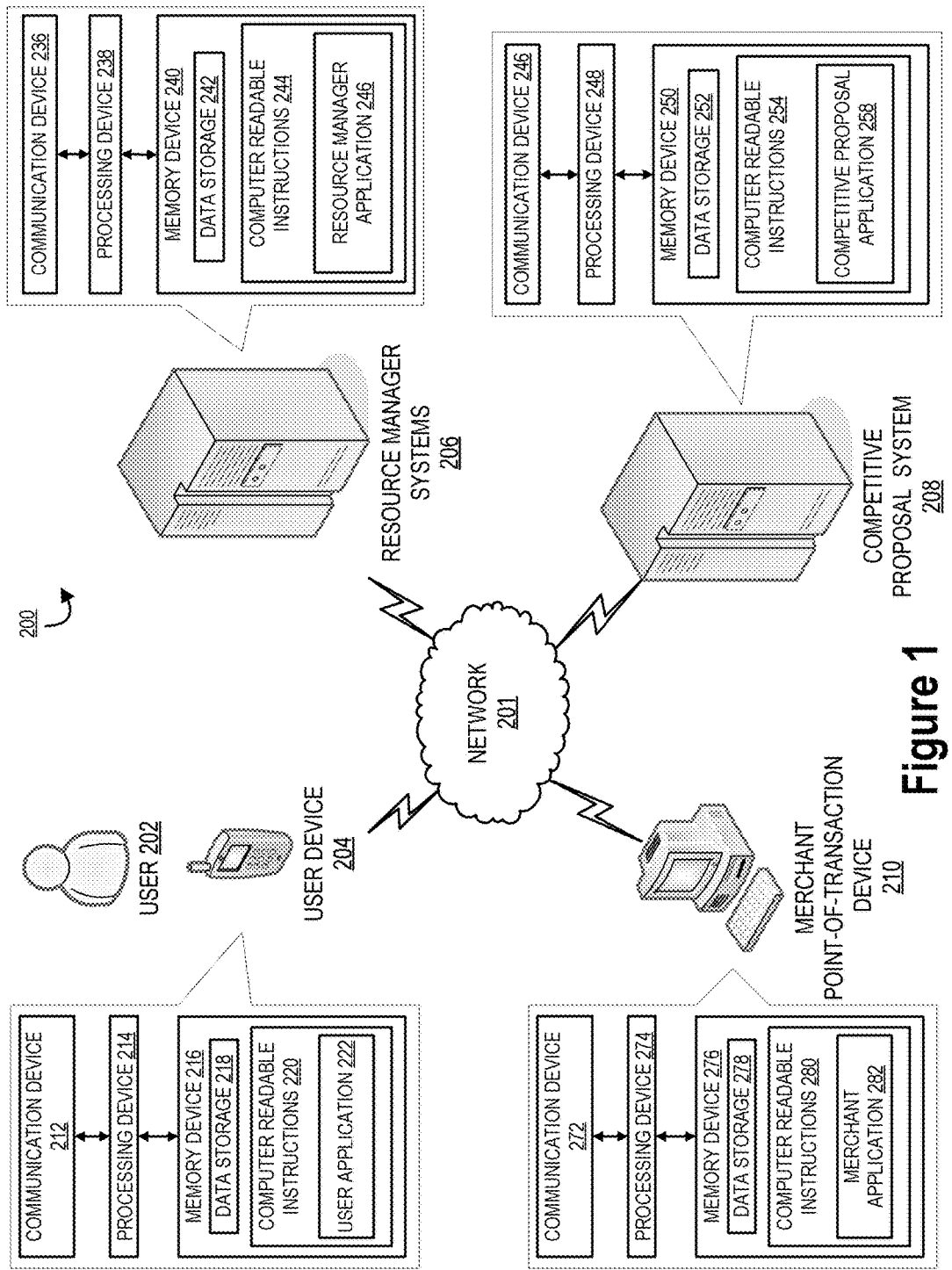
Figure 2:
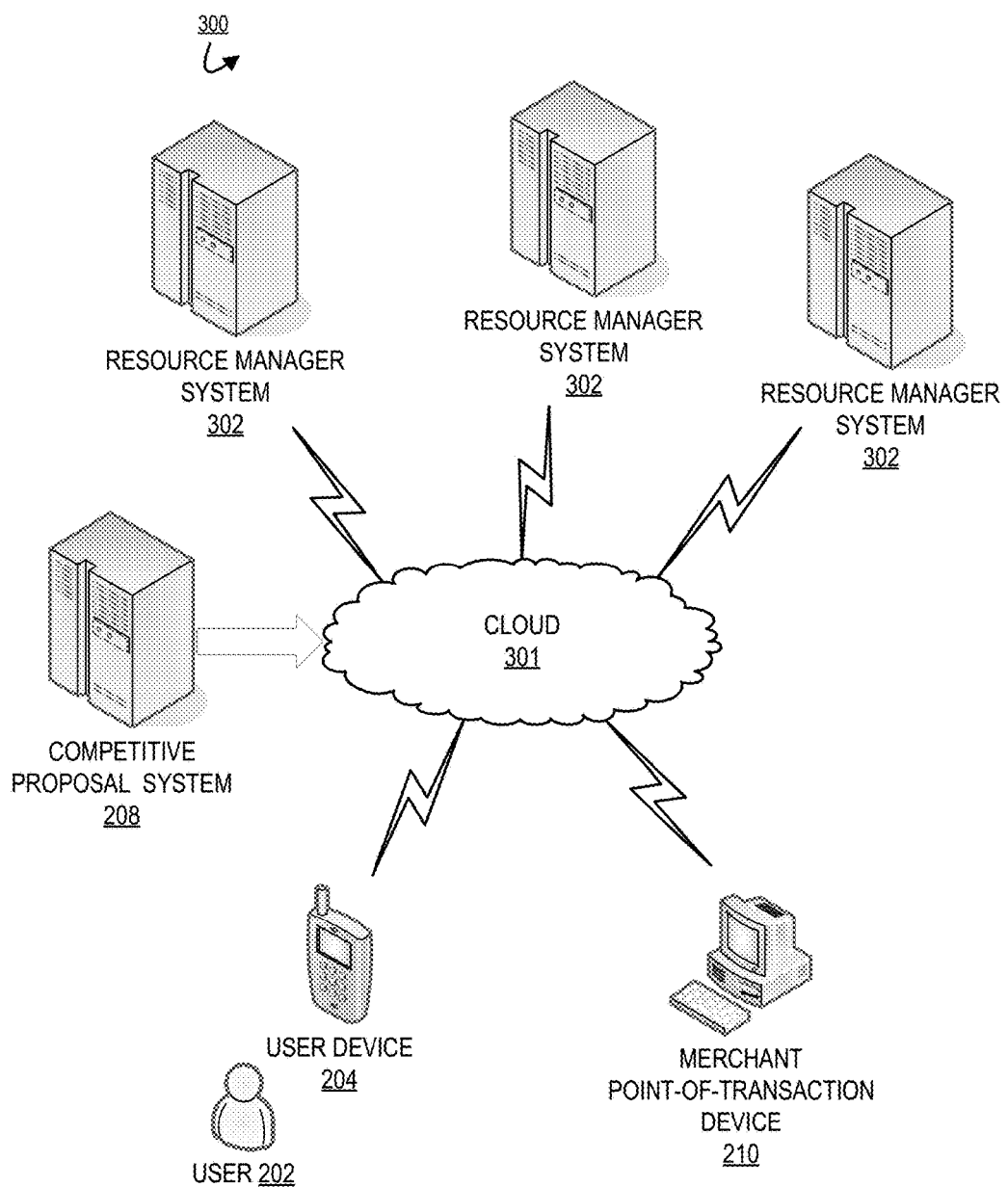

Having thus described embodiments of the invention in general terms, reference will now be made to the accompanying drawings, wherein:

FIG. 1 provides a competitive proposal system environment, in accordance with one embodiment of the invention;

FIG. 2 provides a cloud-based competitive proposal system environment, in accordance with one embodiment of the invention.

Figure 3:
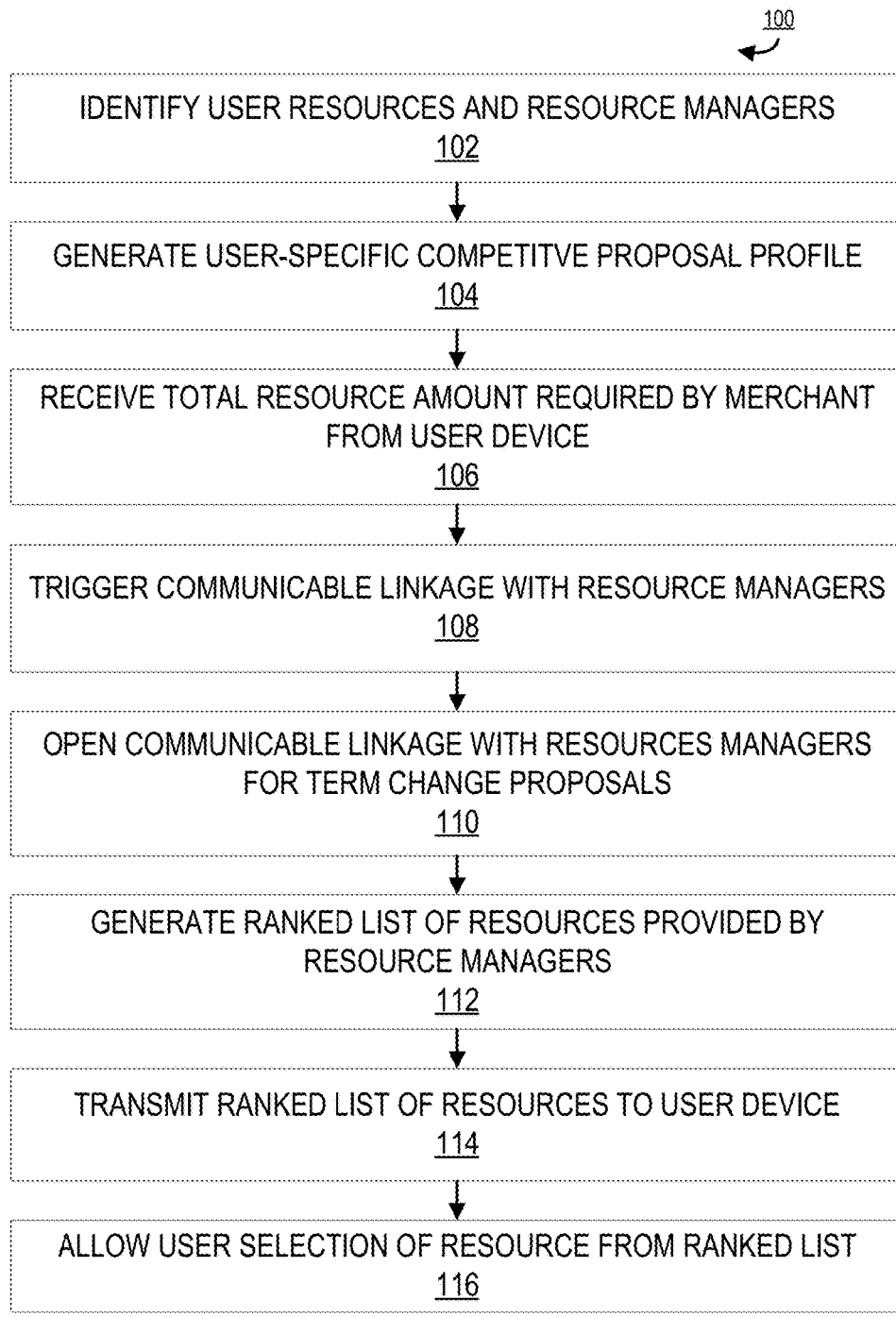
Figure 4:
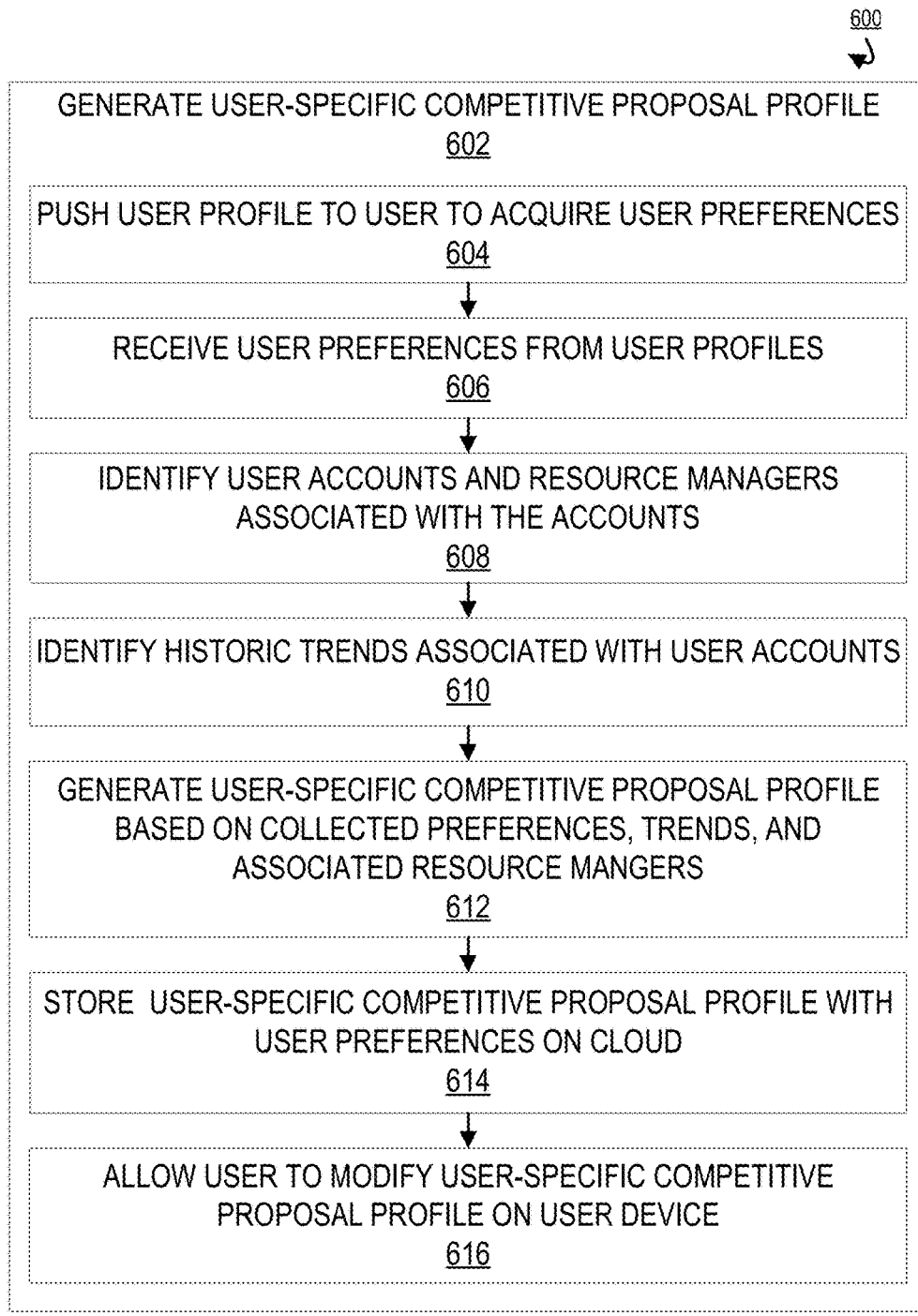
Figure 5:
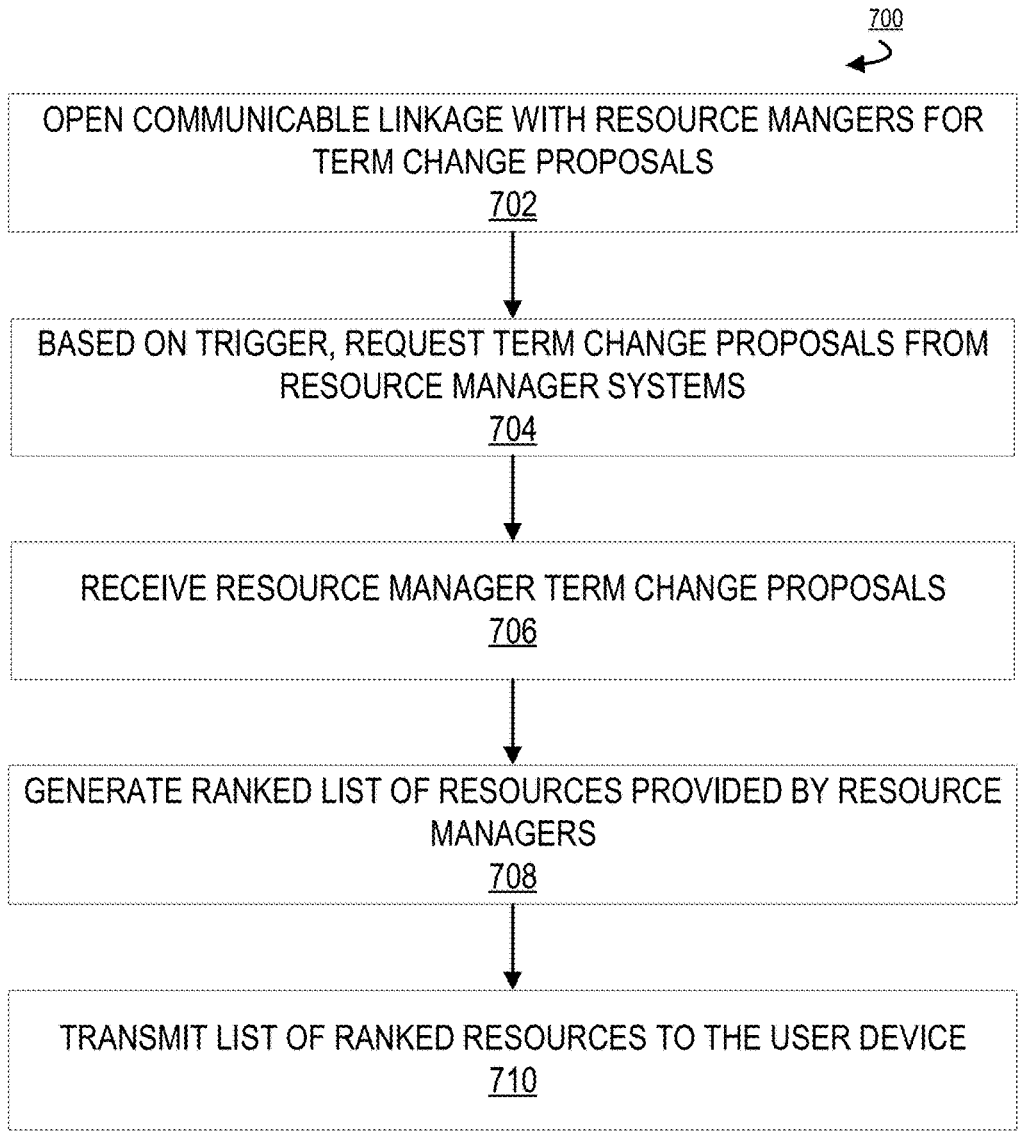
Figure 6:
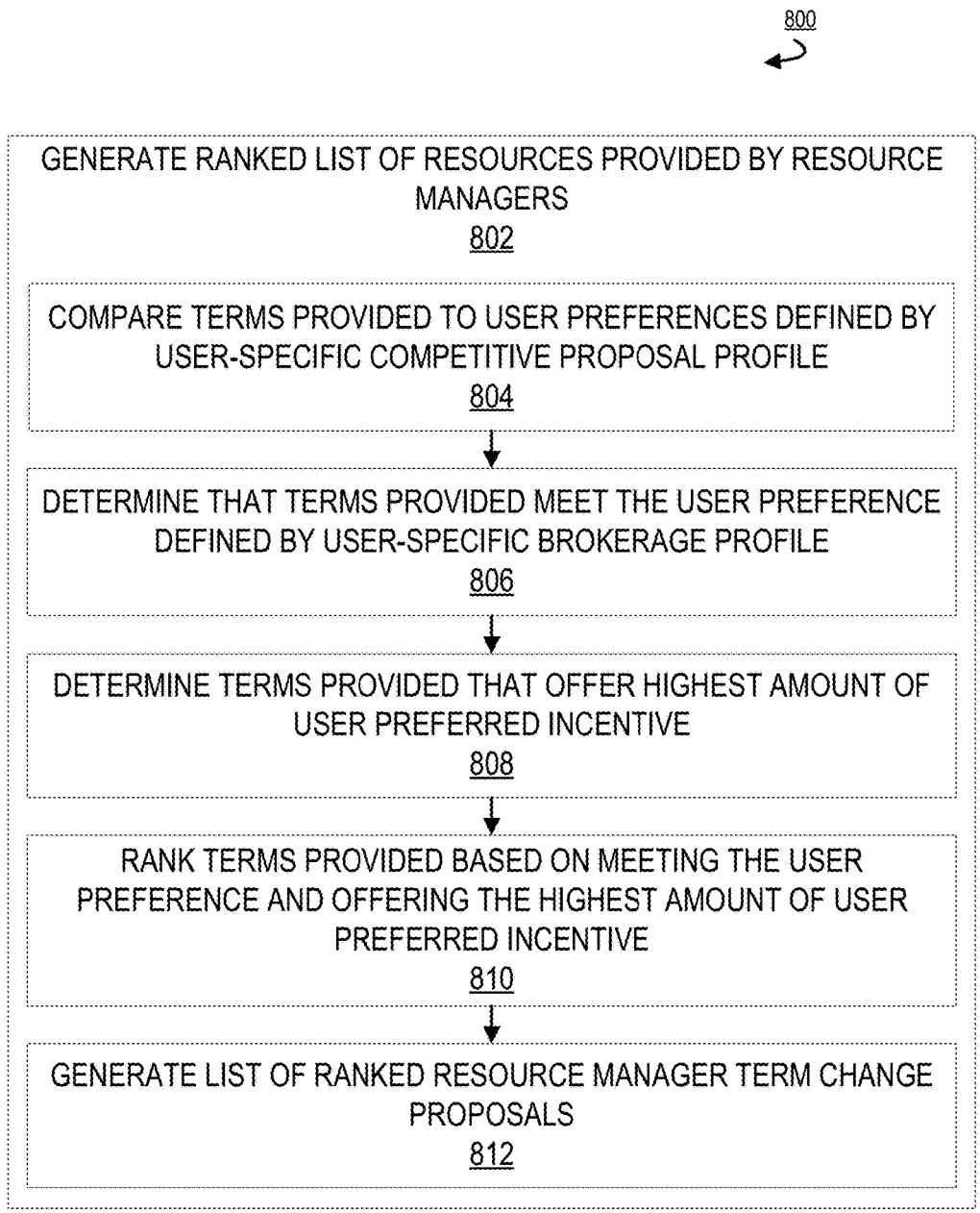

FIG. 3 provides a high level process flow illustrating implementation of a competitive proposal system, in accordance with one embodiment of the invention;

FIG. 4 provides a high level process flow illustrating generation of a user-specific competitive proposal profile, in accordance with one embodiment of the invention;

FIG. 5 provides a high level process illustrating opening a communicable linkage with resource managers in detail, in accordance with one embodiment of the invention; and FIG. 6 provides a high level process illustrating generating a ranked list of resources, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. A "resource" is an account of the user, and/or a payment device associated with an account of the user. Examples of resources may be accounts that have cash or cash equivalents, a credit card and associated credit card account, a debit card and associated banking account, or accounts that are funded with or contain property, such as safety despots box account that jewelry, a trust account that is funded with property, or the like. In some embodiments, a "resource" may also be a goods or services provided by a manufacturer, business, and/or the like to the user.

A "transaction" refers to any communication between a user and the financial institution or other entity monitoring the user's activities. A transaction may refer to a physical or virtual purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the present invention address the above needs and/or achieve other advantages by providing apparatuses (e.g., a system, computer program product and/or other device) and methods for providing a cloud-based competitive proposal service allowing a user to receive competitive term proposals from one or more resource managers in real time. The present invention improves the process of a user selecting a resource to complete a transaction by allowing for resource managers to compete for the user's selection thereby ensuring that the resource selected provides the most value to the user according to the user's preferences. Additionally, the present invention allows resource managers the opportunity to potentially procure additional business by offering competitive, user-specific proposals in real-time.

FIG. 1 illustrates a competitive proposal system environment 200, in accordance with one embodiment of the present invention. As illustrated in FIG. 1, the competitive proposal system 208 is operatively coupled, via a network 201 to the user device 204, a merchant point-of-transaction device 210, and one or more resource manager systems 206. In this way, the competitive proposal system 208 can send and receive information to and from the user device 204, the merchant point-of-transaction device 210, and the one or more resource manager systems 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity initiating a transaction for a product or service using a resource managed by a resource manager. In some embodiments, the user 202 may have a user device 204. FIG. 1 also illustrates a user device 204. The user device 204 may be, for example, a desktop personal computer, a mobile system, such as a cellular phone, smart phone, personal data assistant (PDA) wearable device, laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the one or more resource manager systems 206 and the competitive proposal system 208. As such, the communication device 212 generally comprises a modem, server, or other device for communicating with other devices on the network 201.

The user device 204 comprises computer-readable instructions 220 and data storage 218 stored in the memory device 216, which in some embodiments includes the computer-readable instructions 220 of a user application 222. In some embodiments, the user application 222 allows a user 202 to select a resource, communicate with the merchant point-of-transaction device 210, and authorize a transaction for completion.

As further illustrated in FIG. 1, the competitive proposal system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the one or more resource manager systems 206, the merchant point-of-transaction device 210, and the user device 204. As such, the communication device 246 generally comprises a modem, server, or other device for communicating with other devices on the network 201.

As further illustrated in FIG. 1, the competitive proposal system 208 comprises computer-readable instructions 254 stored in the memory device 250, which in one embodiment includes the computer-readable instructions 254 of a competitive proposal application 258. In some embodiments, the memory device 250 includes data storage 252 for storing data related to the system environment 200, but not limited to data created and/or used by the competitive proposal application 258.

Embodiments of the competitive proposal system 208 may include multiple systems, servers, computers or the like maintained by one or many entities. FIG. 1 merely illustrates one of those systems that, typically, interacts with many other systems to form a cloud-based network. In one embodiment of the invention, the competitive proposal system 208 is operated by an entity that acts as a resource manager to the user. In some embodiments, the competitive proposal system 208 is operated by an entity that is separate or does not act as a resource manager.

The processing device 248 is configured to use the communication device 246 to gather data, such as data corresponding to user information, transactions, or proposals offered by resource managers. The processing device 248 stores the data that it receives in the memory device 250.

In the embodiment illustrated in FIG. 1 and described throughout much of this specification, the competitive proposal application 258 may gather information related to the user and generate a user-specific profile, request term change proposals from resource managers, and create a ranked list of resources to present to the user for completing a transaction.

In some embodiments, the competitive proposal application 258 identifies resources associated with the user 202. Furthermore, the competitive proposal application 258 may identify the resource managers that are responsible for maintaining, housing, or otherwise managing the resources associated with the user 202.

In some embodiments, the competitive proposal application 258 generates a user-specific competitive proposal profile by first pushing a user profile to the user 202 in order to acquire user preferences. The competitive proposal application 258 sends a command signal to a user device 204 via a network 201 to display a graphical user interface comprising the user profile wherein the user profile comprises fields to be completed by the user 202. In some embodiments, the user profile is transmitted by the competitive proposal application 258 to a user device 204 associated with the user 202. The user profile is completed by the user 202, and upon completion, the user profile is transmitted, via a network 201, by the user device and received by the competitive proposal application 258. Subsequently, the user profile is processed by the competitive proposal application 258, wherein processing the user profile comprises extracting, compiling, and formatting user-inputted data so as to be presented via a graphical user interface.

In some embodiments, the competitive proposal application 258 uses information contained within the user profile to identify user accounts and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. In some embodiments, the user 202 on the user device 204 authorizes the competitive proposal application 258 to access the user accounts associated with the user 202 on the resource manager systems 206. The competitive proposal application 258 receives the account information associated with the user accounts directly from the one or more resource manager systems 206 via a network 201.

In some embodiments of the invention, the competitive proposal application 258 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the competitive proposal application 258 gathers nonfinancial information about the user 202 from a social media account profile associated with the user 202.

In some embodiments, the competitive proposal application 258 stores the user-specific competitive proposal profile on a cloud network 301 as further illustrated in FIG. 2. In some embodiments, the cloud network is maintained by the competitive proposal application 258. In some embodiments, the network 201 is the cloud network. In other embodiments the competitive proposal application 258 stores the user-specific competitive proposal profile in the memory device 250 of the competitive proposal system 208. Access to the user-specific competitive proposal profile is provided to the resource manager systems 206 by the competitive proposal application 258 via a network 201 during the competitive proposal process allowing the one or more resource manager systems 206 access over a network 201 to the user preferences and historic trends associated with the user 202 in order for the one or more resource managers to offer a competitive proposal that may be seen as attractive to the user 202. In some embodiments of the invention, the user-specific competitive proposal profile is transmitted by the competitive proposal application 258 via a network 201 to the one or more resource manager systems 206 and stored on the resource manager systems 206, wherein user-specific competitive proposal profiles stored on the resource manager system 206 are updated in real-time by the competitive proposal application 258 via a network 201 as new information is transmitted to the competitive proposal application 258 from the user device 204 via a network 201.

In some embodiments, the competitive proposal application 258 allows the user 202 to modify the user-specific competitive proposal profile on the user device 204 associated with the user 202 ensuring that the user-specific competitive proposal profile contains current user preferences, historic trends, and resource managers associated with the user 202. Upon request by the user 202, the user-specific competitive proposal profile may be transmitted by the competitive proposal application 258 via a network 201 to the user device 204. Upon the user 202 updating the user-specific competitive proposal profile on the user device 204, the user-specific profile is transmitted back by the user device 204 and received by the competitive proposal application 258 and stored on the cloud network maintained by the competitive proposal application 258. In some embodiments of the invention, the user-specific profile may be stored on the user device 204 and received by the competitive proposal system 208 upon the user 202 updating the user-specific profile, wherein the user-specific profile with the current user preferences, historic trends, and resource managers associated with the user 202 may be transmitted to the resource manager systems 206 during the competitive proposal process. In some embodiments, the competitive proposal application 258 may automatically transmit the user-specific profile to the user device 204 in response to a predefined period of user inactivity, wherein the competitive proposal system 208 prompts the user 202 to update the user-specific profile and/or confirm that all user preferences, historic trends, and resource managers associated with the user 202 are current. Upon the user 202 updating and/or confirming the user-specific profile, the user-specific profile is transmitted via a network 201 by the user device 204 and received by the competitive proposal application 258, wherein the user-specific profile with the current user preferences, historic trends, and resource managers associated with the user 202 may be transmitted to the resource manager systems 206 during the competitive proposal process.

In some embodiments, the competitive proposal application 258 may receive from the user device 204 a total resource amount required by the merchant for the transaction between the user 202 and the merchant at a merchant location. Upon all items contributing to the total resource amount required by the merchant being scanned by the merchant, the user device 204 communicates via radio frequency (RF) communication or some other wireless communication method with a merchant point-of-transaction device 210 and triggers a payment process. In response to the triggering of the payment process, the total resource amount is transmitted by the user device 204 over a network 201 and received by the competitive proposal application 258.

In some embodiments, the competitive proposal application 258 is triggered to establish a communicable linkage with the resource manager systems 206 in response to receiving the total resource amount required by the merchant for the transaction between the user 202 and the merchant at the merchant location. The communicable linkage between the resource manager systems 206 and the competitive proposal application 258 is established in order to acquire term change proposals from the one or more resource managers, wherein the competitive proposal application 258 and the one or more resource manager systems 206 transmit and receive data from one another via a network 201 during the competitive proposal process.

The competitive proposal application 258 requires all systems and devices participating in the competitive proposal process to implement an application program interface (API) and an accessible cloud service with appropriate security capable of sending and/or receiving proposals as defined by a manager of the competitive proposal management system.

In some embodiments, the competitive proposal application 258 generates a ranked list of the resources associated with the term change proposals from the one or more resource managers. In some embodiments of the invention, generating a ranked list of resources from the one or more resource managers further comprises analyzing the user preferences, wherein the user preferences include a preferred form of reward, incentive, and/or discount such as cash back, more reward points, lower interest rates, and/or the like provided to the user 202 by an associated resource relative to current terms set forth by the one or more resource managers upon selection of the associated resource to complete the transaction.

In some embodiments of the invention, generating a ranked list of the resources associated with the term change proposals from the one or more resource managers comprises generating a confidence score for each of the resources on the ranked list, wherein the confidence score comprises a confidence of the user employing a specific resource for providing the total resource amount to the merchant and completing the transaction. The confidence score is based on weighted factors, wherein the weight factors may include in descending order of weight value: user preferences, past transaction data, historic trends, and/or location data associated with the user 202.

In some embodiments, the competitive proposal application 258 transmits the ranked list of resources to the user device 204 associated with the user 202 via a network 201. The competitive proposal application 258 transmits a command signal to the user device 204 causing it to display a graphical user interface containing the ranked list of resources.

In some embodiments, the competitive proposal application 258 allows the user to select a resource from the ranked list of resources on the graphical user interface to provide the total resource amount to the merchant and complete the transaction. In some embodiments of the invention, the competitive proposal application 258 automatically selects a first resource on the ranked list and transmits the first resource to the merchant point-of-transaction device 210 via a network to complete the transaction. In other embodiments of the invention, the competitive proposal system 208 identifies a first resource on the ranked list of resources with a confidence score that meets or exceeds a predetermined confidence limit and transmits the first resource on the ranked list to the merchant point-of-transaction device 210 for providing the total resource amount to the merchant and completing the transaction.

In some embodiments, the competitive proposal application 258 transmits the ranked list of resources to the user device 204 associated with the user 202. The competitive proposal application 258 transmits a command signal to the user device 204 causing it to display a graphical user interface containing the ranked list of resources and allowing for the user 202 to select a resource from the ranked list and complete the transaction.

As illustrated in FIG. 1, the merchant point-of-transaction device 210 generally comprises a communication device 272, a processing device 274, and a memory device 276, wherein the processing device 274 is operatively coupled to the communication device 272 and memory device 276. Further, the memory device 276 comprises data storage 278 computer-readable instructions 280, which in some embodiments includes the computer-readable instructions 280 of a merchant application 282. The merchant point-of-transaction device 210 may use the communication device 272 to communicate over the network 201 with other systems and servers in the system environment 200, such as the user device 204, the resource manager systems 206, and the competitive proposal system 208. In some embodiments, the merchant application 282 allows the merchant point-of-transaction device 210 to communicate with the user device 204, and other systems in order to receive a resource for completion of a transaction and to complete the processing of the transaction.

The resource manager systems 206 generally comprise a communication device 236, a processing device 238, and a memory device 240, wherein the processing device 238 is operatively coupled to the communication device 236 and memory device 240. Further, the memory device 240 comprises data storage 242 computer-readable instructions 244, which in some embodiments includes the computer-readable instructions 244 of a resource manager application 246. The resource manager systems 206 may use the communication device 236 to communicate over the network 201 with other systems and servers in the system environment 200, such as the user device 204, the merchant point-of-transaction device 210, and the competitive proposal system 208. In some embodiments, the resource manager application 246 allows the resource manager systems 206 to communicate with the competitive proposal system 208 in order to receive proposal requests and transmit proposals. The resource manager system 206 is associated with a resource manager that provides a resource with established terms to the user 202, wherein a resource is an account of the user, and/or a payment device associated with an account of the user such as accounts that have cash or cash equivalents, a credit card and associated credit card account, a debit card and associated banking account, and the like. In some embodiments, the resource manager may be a manufacturer, business, and/or the like, wherein a resource may be goods or services.

FIG. 2 illustrates a cloud-based competitive proposal system environment 300, in accordance with some embodiments of the invention. In some embodiments, a cloud network 301 is maintained and managed by the competitive proposal system 208. The cloud network 301 comprises the competitive proposal system 208, user device 204, merchant point-of-transaction device 210, and the resource manager systems 302. As illustrated in FIG. 1, in some embodiments, the cloud network can comprise one or more resource manager systems, wherein the one or more resource manager systems are operated and maintained by different resource managers. In other embodiments, a resource manager may provide multiple resource manager systems 302 to be included in the cloud network 301. Through the cloud network 301, the competitive proposal system 208 may provide access to networks, servers, processing capabilities, storage, services, and the like for other systems on the network 201. In some embodiments, information can be stored and processed on the cloud network 301 instead of a local computing device such as the user device 204, wherein memory and processing capabilities of the local computing device remain unaffected.

FIG. 3 provides a high level process flow for completing a transaction between a user and a merchant using a cloud-based competitive proposal service management system 100, in accordance with one embodiment of the present invention. As illustrated by block 102, a competitive proposal system 208 identifies resources associated with the user 202. Furthermore, the competitive proposal system 208 may identify the resource managers that are responsible for maintaining, housing, or otherwise managing the resources associated with the user 202. In some embodiments of the invention, the one or more resource managers are financial institutions that provide and manage one or more credit cards, debit cards, lines of credit and/or the like to the user 202. In some embodiments, the resources are the one or more credit cards, debit cards, lines of credit and/or the like that the financial institutions provide to the user 202. For example, a resource manager may be a bank or a credit card company that provides and manages a credit card to the user 202.

In some embodiments, the one or more resource managers may be manufacturers of a product, wherein the resources are offers for products that the one or more manufacturers produce, wherein the offers could be discounts, coupons, and/or the like associated with the products. In some embodiments of the invention, the resource managers associated with the user 202 are identified by receiving communication from the user 202. In other embodiments, the resources associated with the user 202 are identified from accounts associated with the user 202 extracted and/or identified by the competitive proposal system 208.

As illustrated by block 104 of FIG. 3, the competitive proposal system 208 generates a user-specific competitive proposal profile.

The generation of a user-specific competitive proposal profile is further illustrated in FIG. 4. As illustrated in FIG. 4 which provides a process flow for generating a user-specific competitive proposal profile 600, the competitive proposal system 208 generates the user-specific competitive proposal profile in block 602 by first pushing a user profile to the user 202 in order to acquire user preferences as illustrated in block 604. The user profile comprises fields to be completed by the user 202. For example, the user profile may contain fields for user input such as a name, address, phone number, email address, social media account information, preferred form of reward or incentive, financial account information and/or the like. In some embodiments, the user profile is transmitted by the competitive proposal system 208 to a user device 204 associated with the user 202. The user profile is completed by the user 202, and upon completion, the user profile is transmitted and received by the system from the user device 204. Subsequently, the user profile is processed by the competitive proposal system 208, wherein processing the user profile comprises extracting, compiling, and formatting user-inputted data so as to be presented via a graphical user interface.

As illustrated by block 606 in FIG. 4, the competitive proposal system 208 processes the user profile and receives the user preferences, wherein the user preferences comprise preferences of the user 202 for a specific form of reward, incentive, and/or discount such as cash back, reward points, lower interest rates, and/or the like. For example, the user 202 may state in response to a prompt in the user profile that he/she prefers to receive cash back rather than reward points for a transaction. In some embodiments the form of reward could be a coupon, rebate, and/or the like provided by a manufacturer of a product for the product associated with the manufacturer that is included in the transaction between the user 202 and the merchant. For example, the user 202 may state in response to a prompt in the user profile that he/she prefers to receive a coupon that can be immediately applied to the transaction instead of a mail-in rebate.

As illustrated in block 608 in FIG. 4, the process 600 continues by identifying user accounts and resource managers associated with the accounts. As such, the competitive proposal system 208 uses information contained within the user profile to identify user accounts and one or more resource managers associated with the user accounts. The user accounts may be financial accounts such as a savings account, checking account, credit card account and/or the like. Account information such as account identifying numbers, credit card numbers, account manager and/or the like is obtained from the user profile completed by the user 202. For example, the user 202 may complete the user profile and provide information regarding a credit card associated with the user 202 and a credit card company that manages an account associated with the credit card. In some embodiments, the user 202 authorizes the competitive proposal system 208 to access the user accounts associated with the user 202, and the competitive proposal system 208 receives the account information associated with the user accounts directly from the one or more resource managers. In some embodiments of the invention, the competitive proposal system 208 may be maintained by a financial institution that also manages one or more accounts of the user 202, and the account information is already known by the financial institution without the user 202 needing to provide the account information in the user profile. In some embodiments, the user accounts may be nonfinancial accounts such as social media accounts, wherein the competitive proposal system 208 gathers nonfinancial information about the user 202 from a social media account profile associated with the user 202.

As illustrated in block 610 of FIG. 4, the competitive proposal system 208 extracts information contained within the user profile to identify historic trends associated with the user accounts. The system 208 may extract transaction purchase amounts, date and time of a transaction, location of a transaction, items included in a transaction and the like associated with a user account in order to identify historic trends.

Historic trends may include, for example, but are not limited to a proclivity of the user 202 for purchasing a specific brand of an item, a frequency that the user 202 shops at a merchant location, an average total amount of money spent by the user 202 while shopping at a merchant location, other behavioral tendencies of the user 202, and/or the like. For example, the competitive proposal system 208 may recognize from past transactions associated with a user account that the user 202 has travelled a certain number of times over a time period and associate a tendency to travel with the user 202. In some embodiments, wherein the user account is a social media account, the competitive proposal system 208 may identify trends from a social media account associated with the user 202 by recognizing words or phrases frequently employed by the user 202, wherein the words or phrases may be a product brand name, a merchant name or location, and/or the like. The competitive proposal system 208 may also identify trends from the social media account associated with the user 202 by recognizing pages on a social media platform associated with the social media account that have been made favorite by the user 202. For example, the competitive proposal system 208 may identify a proclivity of the user 202 for a certain brand of a product by recognizing that the user 202 "liked" the page on the social media platform associated with the certain brand of the product.

As illustrated in block 612 of FIG. 4, the competitive proposal system 208 uses collected information associated with the user 202 to generate a user-specific competitive proposal profile for the user 202 based on the user preferences, historic trends, and the one or more resource managers associated with the user 202. Access to the user-specific competitive proposal profile is provided to the one or more resource managers by the competitive proposal system 208 during a competitive proposal process.

As seen in block 614 of FIG. 4, the process 600 continues by storing the user-specific competitive proposal profile on a cloud network 301 as seen in FIG. 2. In some embodiments, the cloud network 301 is maintained by the competitive proposal system 208. Access to the user-specific competitive proposal profile is provided to the resource manager systems 206 by the competitive proposal system 208 during the competitive proposal process allowing the one or more resource managers access to the user preferences and historic trends associated with the user 202 in order for the one or more resource managers to offer a competitive proposal that may be seen as attractive to the user 202. In some embodiments of the invention, the user-specific competitive proposal profile is transmitted to the one or more resource managers and stored on the resource manager systems 206, wherein user-specific competitive proposal profiles stored on the resource manager system 206 are updated in real time by the competitive proposal system 208 as new information associated with the user becomes available to ensure that the one or more resource managers are able to provide competitive proposals that may be seen as attractive to the user 202 based on recent information associated with the user 202. In other embodiments, aspects of the user-specific competitive proposal profile is kept private from the resource managers. The competitive proposal system 208 may not allow the resource managers to access the user preferences and instead matches the user-specific competitive profile to received offers from the resource managers.

As illustrated in block 616 of FIG. 4, the competitive proposal system 208 allows the user 202 to modify the user-specific competitive proposal profile on the user device 204 associated with the user 202 ensuring that the user-specific competitive proposal profile contains current user preferences, historic trends, and resource managers associated with the user 202. Upon request by the user 202, the user-specific competitive proposal profile may be transmitted by the competitive proposal system 208 to the user device 204. Upon the user 202 updating the user-specific competitive proposal profile on the user device 204, the user-specific profile is received by the competitive proposal system 208 and stored on the cloud network 301 maintained by the competitive proposal system 208. In some embodiments of the invention, the user-specific profile may be stored on the user device 204 and received by the competitive proposal system 208 upon the user 202 updating the user-specific profile, wherein the user-specific profile with the current user preferences, historic trends, and resource managers associated with the user 202 may be provided to the resource manager systems 206 during the competitive proposal process. In some embodiments, the competitive proposal system 208 may automatically transmit the user-specific profile to the user device 204 in response to a predefined period of user inactivity, wherein the competitive proposal system 208 prompts the user 202 to update the user-specific profile and/or confirm that all user preferences, historic trends, and resource managers associated with the user 202 are current. Upon the user 202 updating and/or confirming the user-specific profile, the user-specific profile is received by the competitive proposal system 208, wherein the user-specific profile with the current user preferences, historic trends, and resource managers associated with the user 202 may be provided to the resource manager systems 206 during the competitive proposal process.

Referring back to FIG. 3, as illustrated in block 106, after generating the user-specific competitive proposal profile 104, the process 100 continues by receiving at the competitive proposal system 208 from the user device 204 a total resource amount required by the merchant for the transaction between the user 202 and the merchant at a merchant location. Upon all items contributing to the total resource amount required by the merchant being scanned by the merchant, the user device 204 communicates with a merchant point-of-transaction device 210 and triggers a payment process. In response to the triggering of the payment process, the total resource amount is received by the competitive proposal system 208 from the user device 204 via network communication. In some embodiments of the invention, the communication between the user device 204 and the merchant point-of-transaction device 210 may be a wireless radio frequency (RF) communication or other wireless communication method.

As illustrated in block 108 of FIG. 3 the competitive proposal system 208 is triggered to establish a communicable linkage with the resource manager systems 206 in response to receiving the total resource amount required by the merchant for the transaction between the user 202 and the merchant at the merchant location. The communicable linkage between the resource manager systems 206 and the competitive proposal system 208 is established in order to acquire term change proposals from the one or more resource managers, wherein term change proposals comprise changes to pre-established payment terms between the user 202 and the one or more resource managers such as interest rates, amount of cash back earned by the user 202, amount of reward points earned by the user 202, and/or the like. For example, a resource manager may propose to the user 202 a lower interest rate for the transaction relative to a pre-established interest rate in return for the user 202 choosing to complete the transaction using a credit card associated with the resource manager.

The competitive proposal system 208 requires all systems and devices participating in the competitive proposal process to implement an application program interface (API) and an accessible cloud service with appropriate security capable of sending and/or receiving proposals as defined by a manager of the competitive proposal management system.

As illustrated in block 112, the competitive proposal system 208 generates a ranked list of the resources associated with the term change proposals from the one or more resource managers. In some embodiments of the invention, generating a ranked list of resources from the one or more resource managers further comprises analyzing the user preferences, wherein the user preferences include a preferred form of reward, incentive, and/or discount such as cash back, more reward points, lower interest rates, and/or the like provided to the user 202 by an associated resource relative to current terms set forth by the one or more resource managers upon selection of the associated resource to complete the transaction. For example, if the user-specific competitive proposal profile states that the user 202 prioritizes lower interest rates over cash back, the competitive proposal system 208 will rank a resource that provides a lower interest rate over a resource that provides cash back.

In some embodiments of the invention, generating a ranked list of the resources associated with the term change proposals from the one or more resource managers comprises generating a confidence score for each of the resources on the ranked list, wherein the confidence score comprises a confidence of the user employing a specific resource for providing the total resource amount to the merchant and completing the transaction. The confidence score is based on weighted factors, wherein the weight factors may include in descending order of weight value: user preferences, past transaction data, historic trends, and/or location data associated with the user 202.

As illustrated in block 114, the competitive proposal system 208 transmits the ranked list of resources to the user device 204 associated with the user 202. The competitive proposal system 208 transmits a command signal to the user device 204 causing it to display a graphical user interface containing the ranked list of resources.

As illustrated in block 116, the competitive proposal system 208 allows the user to select a resource from the ranked list of resource to provide the total resource amount to the merchant and complete the transaction. In some embodiments of the invention, the competitive proposal system 208 automatically selects a first resource on the ranked list and completes the transaction. In some embodiments of the invention, the competitive proposal system 208 identifies a first resource on the ranked list of resources with a confidence score that meets or exceeds a predetermined confidence limit and transmits the first resource on the ranked list to the merchant for providing the total resource amount to the merchant and completing the transaction.

In some embodiments of the invention, the merchant may be allowed to enter the competitive proposal process by incentivizing the user 202 to complete the transaction through a real-time, direct transfer of cash to a financial account associated with the merchant from a financial account associated with the user 202, wherein third party resource managers are not required to complete the transaction. By not including the third party resource managers, the merchant is able to avoid any potential processing fees associated with the third party resource managers, and cost of completing the transaction for the merchant is reduced. Additionally, risk of crime for the merchant such as robbery is reduced as all cash is transferred electronically and not located at the merchant location. In some embodiments, the merchant may incentivize the user 202 to complete the transaction through the real-time, direct transfer of cash by offering a discount to the total resource amount required by the merchant, in-store credit, gift cards and/or the like. In some embodiments, the merchant's depository information is transmitted directly to the competitive proposal system 208 by the merchant point-of-transaction device 210, while in another embodiment, the user device 204 receives the merchant's depository information from the merchant point-of-transaction device 210 and transmits the information to the competitive proposal system 208. In some embodiments, the communication between the user device 204 and the merchant point-of-transaction device 210 may be accomplished through near-field communication (NFC) or other wireless communication technology. In some embodiments, the merchant may be notified by the competitive proposal system 208 of competing term change proposals offered by the resource managers to the user 202. In other embodiments, the merchant is unaware of the competing term change proposals offered by the resource managers to the user 202.

In some embodiments of the invention, the one or more resource managers comprise one or more manufacturers of competing products similar to a product to be included in the transaction, wherein the ranked list of resources comprises a ranked list of product proposals from the one or more manufacturers of the competing products similar to the product to be included in the transaction between the user 202 and the merchant. Upon identifying the product has been selected by the user 202 to be included in the transaction, the competitive proposal system 208 generates the ranked list of product proposals from the one or more manufacturers of competing products similar to the product to be included in the transaction.

FIG. 5 provides a process flow for requesting, receiving, and transmitting term change proposals from the resource managers 700. As illustrated in block 702, the competitive proposal system 208 is triggered to establish a communicable linkage with the resource manager systems 206 in response to receiving the total resource amount required by the merchant for the transaction between the user 202 and the merchant at the merchant location. The communicable linkage between the resource manager systems 206 and the competitive proposal system 208 is established in order to acquire term change proposals from the one or more resource managers, wherein term change proposals comprise changes to pre-established payment terms between the user 202 and the one or more resource managers such as interest rates, amount of cash back earned by the user 202, amount of reward points earned by the user 202, and/or the like. In some embodiments, the one or more resource managers are manufacturers of a competing product similar to a product to be included in the transaction, wherein the term change proposals are proposed price changes, discounts, coupons, rebates and/or other like incentives for a product offered by a manufacturer of a product in return for including the product in the transaction.

As illustrated in block 704 of FIG. 5, based on the triggering the establishment of the communicable linkages with the resource manager systems 206, the competitive proposal system 208 requests the term change proposals from the resource manager systems 206 for the resources associated with the one or more resource managers and the user 202. The competitive proposal system 208 allows the one or more resource managers to access the user-specific competitive proposal profile stored in the cloud and to use the information contained within the user-specific profile to offer attractive and competitive proposals to the user 202. In some embodiments of the invention, the competitive proposal system 208 also requests offers from one or more resource managers not associated with the user 202 to compete with the term change proposals provided by the one or more resource managers already associated with the user 202. For example, the competitive proposal system 208 may request an offer for terms associated with a new credit card from a credit card company not already associated with the user 202 to compete with the term changes provided by credit card companies already associated with the user 202, wherein the user 202 may sign-up for the new credit card and complete the transaction with the new credit card.

As illustrated in block 706 of FIG. 5, the competitive proposal system 208 receives the term change proposals transmitted from the one or more resource managers. In some embodiments of the invention, receiving the term change proposals from the one or more resource managers through the communicable linkage between the competitive proposal system 208 and the resource manager systems 206 comprises a confidential bidding process, wherein the one or more resource managers submit a single, private term change proposal for a resource associated with the user 202 for completing the transaction between the user 202 and the merchant. The one or more resource managers are unaware of offers proposed by competitor resource managers during the competitive proposal process. In some embodiments, receiving the term change proposals from the one or more resource managers through the communicable linkage between the competitive proposal system 208 and the resource manager systems 206 comprises a public auction, wherein, after offering initial term change proposals, the one or more resource managers may be notified of a currently pending term change proposal from a competitor resource manager. In response, the one or more resource managers not offering the currently pending term change proposal for completing the transaction between the user 202 and the merchant and providing the total resource amount to the merchant may offer additional term change proposals to compete with the currently pending term change proposal.

As illustrated in block 708, the competitive proposal system 208 generates a ranked list of the resources associated with the term change proposals from the one or more resource managers.

FIG. 6 further illustrates the process of generating a ranked list of resources provided by the one or more resource managers 800, wherein the process is used to generate the ranked list as seen in block 802. The process begins with the competitive proposal system 208 first comparing term change proposals provided by the resource managers to the user preferences contained within the user-specific competitive proposal profile as seen in block 804. As illustrated in block 806, the system 208 attempts to match the user-specific competitive proposal profile with term change proposals offered by the one or more resource managers based on the user preferences. After determining a match, the competitive proposal system 208 in block 808 determines the term change proposals that offer the highest amount of user-preferred incentive based on the user preferences. For example, if the user 202 specified a preference for a rebate on a product as a preferred form of incentive, the system 208 will determine the term change proposal that provides the highest rebate amount. As illustrated in block 810, based on comparing the term change proposals with the user preferences and determining which matched term change proposals offer the highest amount of user-preferred incentive, the competitive proposal system 208 ranks the term change proposals provided by the resource managers and subsequently generates a list of the ranked term change proposals as illustrated in blocks 810 and 812 respectively.

In some embodiments of the invention, generating a ranked list of resources from the one or more resource managers further comprises analyzing the user preferences, wherein the user preferences include a preferred form of reward, incentive, and/or discount such as a lower price, a rebate, a coupon, and/or similar offers provided to the user by a manufacturer of a competing product upon selection by the user to include the competing product in the transaction. For example, if the user-specific competitive proposal profile states that the user 202 prioritizes a lower price over a rebate, the competitive proposal system 208 will rank a resource that provides a lower price over a resource that provides a rebate.

In some embodiments of the invention, generating a ranked list of the resources associated with the term change proposals from the one or more resource managers comprises generating a confidence score for each of the resources on the ranked list, wherein the confidence score comprises a confidence of the user selecting a specific product to include in the transaction and is based on weighted factors. The weighted factors may include in descending order of weight value: user preferences, past transaction data, historic trends, and/or location data associated with the user. Based on generated confidence scores for the product proposals, the competitive proposal system 208 may identify a first product proposal on the ranked list of product proposals that possesses a confidence score that meets or exceeds a predetermined confidence limit. The first product proposal on the ranked list of product proposals may be transmitted to the user device 204.

In some embodiments of the invention, the competitive proposal system 208 transmits an in-store location of a first product associated with the first product proposal to the user device 204 with the first product proposal. For example, the user 202 may choose a first brand of milk to be included in the transaction between the user 202 and the merchant. Upon identification that the user 202 has selected the first brand of milk, the competitive proposal system 208 may request product proposals from manufacturers of other brands of milk in competition with the first brand. The competitive proposal system 208 may generate a ranked list of the product proposals from the manufactures of the other brands of milk and generate confidence scores for each of the product proposals. Based on the ranked list and the confidence scores, the competitive proposal system 208 would transmit a first product proposal and in-store location for a second brand of milk to the user device 204, wherein there may be an incentive to add the second brand of milk to the transaction instead of the first brand of milk such as a lower price, a discount, and/or the like.

Referring back to FIG. 5, as illustrated in block 710, the competitive proposal system 208 transmits the ranked list of resources to the user device 204 associated with the user 202. The competitive proposal system 208 transmits a command signal to the user device 204 causing it to display a graphical user interface containing the ranked list of resources.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with generating communicable linkages for providing a cloud-based competitive proposal system 208.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating communicable linkages for providing a cloud-based competitive proposal system 208, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cloud-based competitive proposal service management, the system comprising:
    a computer apparatus including a processor, a memory device, and a communication device; and
    a software module stored in the memory, comprising computer-readable instructions that when executed by the processor cause the processor to:
        identify user resources and one or more resource managers associated with the identified user resources, wherein the one or more resource managers are associated with a third party and comprise one or more resource manager systems;
        generate a user-specific competitive proposal profile, wherein the user-specific competitive proposal profile comprises user resources, user preferences, historic resource trends, and resource manager terms for resource use;
        trigger a communicable linkage with the one or more resource managers based on receiving a determined total resource amount required by a merchant;
        open the communicable linkage with the one or more resource managers for resource manager term change proposals for providing the total resource amount to the merchant, wherein opening the communicable linkage comprises adding an application program interface and a secure accessible cloud service to the one or more resource manager systems;
        receive term change proposals from the one or more resource managers through the communicable linkage;
        generate a ranked list of resources from the one or more resource managers for providing the total resource amount to the merchant, wherein the ranked list of resources further comprise an order of preferred term changes relative to the user preferences;
        transmit the ranked list of resources from the one or more resource managers to the user device; and
        allow user selection of one of the ranked list of resources for providing the total resource amount to the merchant.

2. The system of claim 1, wherein the cloud-based competitive proposal service management system further comprises:

generating a confidence score of the resources on the ranked list of resources, wherein the confidence score comprises a confidence of the user employing a specific resource for providing the total resource amount to the merchant and completing a transaction, wherein generating the confidence score is based on weighted factors, wherein the weighted factors may include in descending order of weighted value: user preferences, past transaction data, historic trends, and/or location data associated with the user;

identifying a first resource on the ranked list of resources with a confidence score that meets or exceeds a predetermined confidence limit; and transmitting, based on identifying the first resource, the first resource on the ranked list of resources to the merchant for providing the total resource amount to the merchant and completing the transaction.

3. The system of claim 1, wherein the one or more resource managers comprise financial institutions that provide a debit card, credit card, and/or line of credit to the user for providing the total resource amount to the merchant and completing a transaction.

4. The system of claim 1, wherein generating the ranked list of resources from the one or more resource managers further comprises analyzing the user preferences, wherein the user preferences include a preferred form of reward, incentive, and/or discount such as cash back, more reward points, lower interest rates, and/or the like provided to the user by an associated resource relative to current terms set forth by the one or more resource managers upon selection of the associated resource to complete the transaction.

5. The system of claim 1, wherein triggering the communicable linkage with the one or more resource managers based on determining the total resource amount required by the merchant further comprises:

receiving from the user device the determined total resource amount required by the merchant; and in response to receiving from the user device the determined total resource amount required by the merchant, establishing a communication link between the user device and the cloud-based competitive proposal service management system.

6. The system of claim 1, wherein receiving the term change proposals from the one or more resource managers through the communicable linkage further comprises a confidential bidding process, wherein the one or more resource managers submit a single, private proposal of terms for the resource associated with the one or more resource managers for completing a transaction and providing the total resource amount to the merchant.

7. The system of claim 1, wherein receiving term change proposals from the one or more resource managers through the communicable linkage further comprises a public auction, wherein the one or more resource managers can place competing proposals of terms for completing the transaction in response to a public, currently pending proposal of terms for the resource associated with the one or more resource managers for completing a transaction and providing the total resource amount to the merchant.

8. The system of claim 1, wherein generating the user-specific competitive proposal profile comprises:

pushing a user profile comprising user preference selectable indicators to the user device;

receiving selected user preferences from the user device based on the pushing of the user profile;

identifying historic trends associated with user accounts; and allowing the user to modify the user specific competitive proposal profile on the user device.

9. The system of claim 1, wherein the cloud-based competitive proposal service management system further comprises generating a cloud-based competitive proposal service application associated with the competitive proposal service management, wherein the cloud-based competitive proposal service application allows for communicable linkage between the resource managers systems, the user device, and a merchant point-of-transaction device for integrative transaction completion.

10. The system of claim 1, wherein the one or more resource managers comprise one or more manufacturers of competing products similar to a product included in a transaction comprising the total resource amount required by the merchant; and wherein the ranked list of resources comprises a ranked list of product proposals from the one or more manufacturers of the competing products similar to the product included in the transaction.

11. The system of claim 10, wherein generating the ranked list of product proposals from the one or more manufacturers of the competing products similar to the product included in the transaction comprises:

analyzing the user preferences, wherein the user preferences include a preferred form of reward, incentive, and/or discount such as a lower price, a rebate, a coupon, and/or similar offers provided to the user by a manufacturer of a competing product upon selection by the user to include the competing product in the transaction;

generating a confidence score of the product proposals on the ranked list of product proposals, wherein the confidence score comprises a confidence of the user selecting a specific product to include in the transaction, wherein generating the confidence score is based on weighted factors, wherein the weighted factors may include in descending order of weighted value: user preferences, past transaction data, historic trends, and/or location data associated with the user;

identifying a first product proposal on the ranked list of product proposals with a confidence score that meets or exceeds a predetermined confidence limit; and transmitting, based on identifying the first product proposal, the first product proposal on the ranked list to the user device.

12. A computer program product for cloud-based competitive proposal service management, the computer program product comprising at least one non-transitory computer-readable medium having computer-readable program code portions embodied therein, the computer-readable program code portions comprising:

an executable portion configured for identifying user resources and one or more resource managers associated with the identified user resources, wherein the one or more resource managers are associated with a third party and comprise one or more resource manager systems;

an executable portion configured for generating a user-specific competitive proposal profile, wherein the user-specific competitive proposal profile comprises user resources, user preferences, historic resource trends, and resource manager terms for resource use;

an executable portion configured for triggering a communicable linkage with the one or more resource managers based on receiving a determined total resource amount required by a merchant;

an executable portion configured for opening the communicable linkage with the one or more resource managers for resource manager term change proposals for providing the total resource amount to the merchant, wherein opening the communicable linkage comprises adding an application program interface and a secure accessible cloud service to the one or more resource manager systems;

an executable portion configured for receiving term change proposals from the one or more resource managers through the communicable linkage;

an executable portion configured for generating a ranked list of resources from the one or more resource managers for providing the total resource amount to the merchant, wherein the ranked list of resources further comprise an order of preferred term changes relative to the user preferences;

an executable portion configured for transmitting the ranked list of resources from the one or more resource managers to the user device; and an executable portion configured for allowing user selection of one of the ranked list of resources for providing the total resource amount to the merchant.

13. The computer program product of claim 12, wherein the cloud-based competitive proposal service management system further comprises:

an executable portion configured for generating a confidence score of the resources on the ranked list of resources, wherein the confidence score comprises a confidence of the user employing a specific resource for providing the total resource amount to the merchant and completing a transaction, wherein generating the confidence score is based on weighted factors, wherein the weighted factors may include in descending order of weighted value: user preferences, past transaction data, historic trends, and/or location data associated with the user;

an executable portion configured for identifying a first resource on the ranked list of resources with a confidence score that meets or exceeds a predetermined confidence limit; and an executable portion configured for transmitting, based on identifying the first resource, the first resource on the ranked list of resources to the merchant for providing the total resource amount to the merchant and completing the transaction.

14. The computer program product of claim 12, wherein the one or more resource managers comprise financial institutions that provide a debit card, credit card, and/or line of credit to the user for providing the total resource amount to the merchant and completing a transaction.

15. The computer program product of claim 12, wherein triggering the communicable linkage with the one or more resource managers based on determining the total resource amount required by the merchant further comprises:

receiving from the user device the determined total resource amount required by the merchant; and in response to receiving from the user device the determined total resource amount required by the merchant, establishing a communication link between the user device and the cloud-based competitive proposal service management system.

16. The computer program product of claim 12, wherein receiving the term change proposals from the one or more resource managers through the communicable linkage further comprises a confidential bidding process, wherein the one or more resource managers submit a single, private proposal of terms for the resource associated with the one or more resource managers for completing a transaction and providing the total resource amount to the merchant.

17. The computer program product of claim 12, wherein receiving term change proposals from the one or more resource managers through the communicable linkage further comprises a public auction, wherein the one or more resource managers can place competing proposals of terms for completing the transaction in response to a public, currently pending proposal of terms for the resource associated with the one or more resource managers for completing a transaction and providing the total resource amount to the merchant.

18. A computer-implemented method for cloud-based competitive proposal service management, the method comprising:

identifying user resources and one or more resource managers associated with the identified user resources, wherein the one or more resource managers are associated with a third party and comprise one or more resource manager systems;

generating a user-specific competitive proposal profile, wherein the user-specific competitive proposal profile comprises user resources, user preferences, historic resource trends, and resource manager terms for resource use;

triggering a communicable linkage with the one or more resource managers based on receiving a determined total resource amount required by a merchant;

opening the communicable linkage with the one or more resource managers for resource manager term change proposals for providing the total resource amount to the merchant, wherein opening the communicable linkage comprises adding an application program interface and a secure accessible cloud service to the one or more resource manager systems;

receiving term change proposals from the one or more resource managers through the communicable linkage;

generating a ranked list of resources from the one or more resource managers for providing the total resource amount to the merchant, wherein the ranked list of resources further comprise an order of preferred term changes relative to the user preferences;

transmitting the ranked list of resources from the one or more resource managers to the user device; and allowing user selection of one of the ranked list of resources for providing the total resource amount to the merchant.

19. The computer-implemented method of claim 18, wherein the cloud-based competitive proposal service management system further comprises:

generating a confidence score of the resources on the ranked list of resources, wherein the confidence score comprises a confidence of the user employing a specific resource for providing the total resource amount to the merchant and completing a transaction, wherein generating the confidence score is based on weighted factors, wherein the weighted factors may include in descending order of weighted value: user preferences, past transaction data, historic trends, and/or location data associated with the user;

identifying a first resource on the ranked list of resources with a confidence score that meets or exceeds a predetermined confidence limit; and transmitting, based on identifying the first resource, the first resource on the ranked list of resources to the merchant for providing the total resource amount to the merchant and completing the transaction.

20. The computer-implemented method of claim 18, wherein triggering the communicable linkage with the one or more resource managers based on determining the total resource amount required by the merchant further comprises:

receiving from the user device the determined total resource amount required by the merchant; and in response to receiving from the user device the determined total resource amount required by the merchant, establishing a communication link between the user device and the cloud-based competitive proposal service management system.

\* \* \* \* \*